(No Model.)
R. B. VANDERBURG.
SOLDERING IRON.
No. 513,222. Patented Jan. 23, 1894.
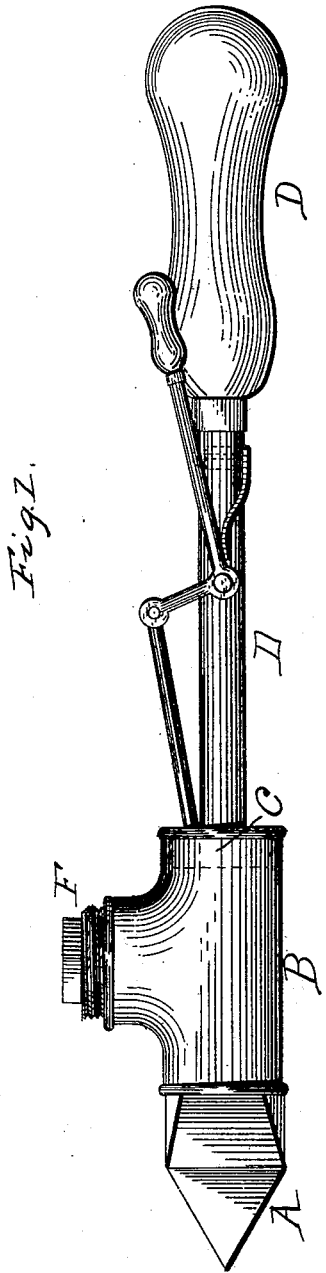
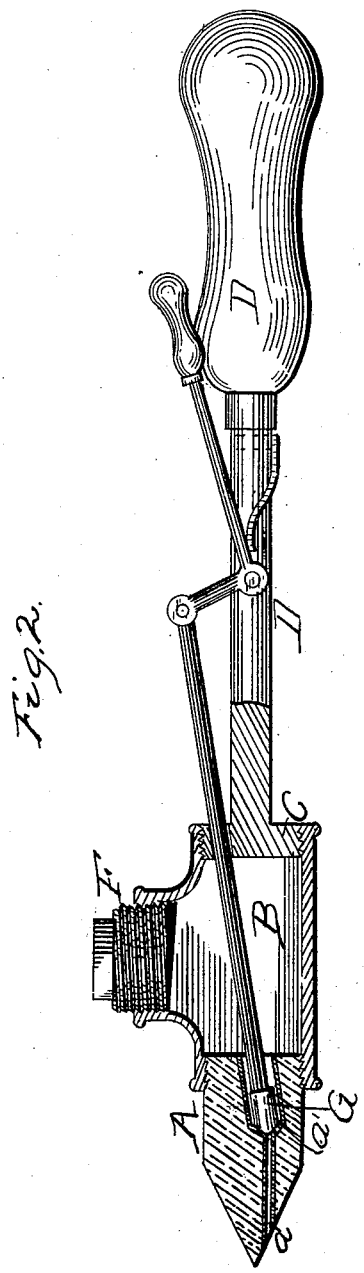
WITNESSES
Thos. J. Rout Jr.
Jas. O'Neale
INVENTOR
Robert B. Vanderburg
By A. H. Evans & Co. Attorneys
THE NATIONAL LITHOGRAPHING COMPANY,
WASHINGTON, D. C.

UNITED STATES PATENT OFFICE.

ROBERT B. VANDERBURG, OF LONG BEACH, ASSIGNOR OF THREE-FOURTHS TO LUDOVIC J. PAINTER, OF SATICOY, CALIFORNIA.

SOLDERING-IRON.

SPECIFICATION forming part of Letters Patent No. 513,222, dated January 23, 1894.

Application filed July 18, 1893. Serial No. 480,822. (No model.)

*To all whom it may concern:*

Be it known that I, ROBERT B. VANDERBURG, a citizen of the United States, residing at Long Beach, in the county of Los Angeles and State of California, have invented certain new and useful Improvements in Soldering-Irons, of which the following is a full, clear, and exact description of the same, reference being had to the accompanying drawings, and to letters of reference marked thereon, which form a part of this specification, in which—

Figure 1, is a side elevation of my improved soldering iron, and Fig. 2, is a longitudinal vertical sectional view of the same.

My invention relates to soldering irons.

It has for its object to provide an iron of this character, which shall contain the metal to be heated, and which shall supply the same to the parts to be soldered, without any danger of the molten metal escaping from the iron, and burning the operator.

With these objects in view, the invention consists in certain features of construction, and combination of parts of the same, which shall be hereinafter described and claimed.

In the accompanying drawings, A, denotes the point or working end of my soldering iron. This is preferably formed of copper and has extending longitudinally through it an aperture or bore $a$, which communicates with a socket $a'$. The socket and bore are lined with a suitable refractory material, such for instance as steel or iron. This protects the copper from the action of the solder which would otherwise soon cut grooves in the bore and render the copper point practically useless.

B, denotes the solder reservoir or receptacle. For convenience of manufacture, I select a simple T pipe joint. Into one end of the reservoir, the copper point is screwed, while in its opposite end, is screwed a plug C, provided with a handle D, and in the top is screwed a cover F.

G, denotes a valve located in the socket of the copper point, and provided with a rod which extends out through a small aperture in the plug. To the rear end of this rod, is pivoted a bell crank lever which in turn is pivoted to the handle, and is provided with a spring whose tension is exerted to raise the lever, and force the valve firmly in its seat to prevent the flow of solder.

Although I prefer to use copper for the working point of my iron, I would have it distinctly understood that any other desired metal may be employed, and that instead of providing the ordinary T pipe joint, I may construct a receptacle which will answer equally as well as that herein described.

It will be seen that when solder is placed within the reservoir, and heated until it assumes a liquid state, the same may be supplied to the parts which it is desired to solder without any danger of the molten metal escaping and burning the operator.

I am aware that it is not new, to construct a soldering iron with a receptacle to contain the solder to be heated, but so far as I am aware, I am the first to provide a soldering iron with a receptacle entirely closed, and by which construction the iron is allowed to be more freely handled without any danger of its contents running out upon the operator.

From the foregoing description taken in connection with the accompanying drawings, the operation and advantage of my invention will be readily understood without any further explanation.

It will be seen that by the employment of the T pipe joint, I am enabled to construct my iron at a greatly reduced cost, more so than I would if I were compelled to make castings.

The parts are extremely simple, and the construction is such that they will not readily get out of order.

Having thus described my invention, what I claim as new, and desire to secure by Letters Patent of the United States, is—

1. A soldering iron consisting of the point or working portion, provided with an aperture and with a socket with which communicates said aperture, a receptacle consisting of a T joint provided at each end with threads, the working portion or point being screwed into one end, a plug screwed into the other end, and a cover screwed into the top of said receptacle, a valve located in said socket, a stem attached to said valve extending out through the said plug, a bell crank pivoted to said handle, and a spring exerting a force upon said bell crank, to close the communication between the socket and the aperture, substantially as herein described.

2. In a soldering iron, a copper point having a socket and a bore lined with a refractory material, in combination with a receptacle secured to said point and adapted to discharge the molten solder through said bore and a valve seated in the socket for controlling the flow of the molten metal, substantially as herein described.

R. B. VANDERBURG.

Witnesses:
WM. S. CLARK,
W. W. LOWE.